US012623483B1

(12) United States Patent
Zrihen

(10) Patent No.: US 12,623,483 B1
(45) Date of Patent: May 12, 2026

(54) PAINTBRUSH AND TOOL HOLDER WITH CLAMP

(71) Applicant: Ariela Kanarek Zrihen, Brookyln, NY (US)

(72) Inventor: Ariela Kanarek Zrihen, Brookyln, NY (US)

( * ) Notice: Subject to any disclaimer, the term of this patent is extended or adjusted under 35 U.S.C. 154(b) by 0 days.

(21) Appl. No.: 19/007,428

(22) Filed: Dec. 31, 2024

(51) Int. Cl.
B44D 3/12 (2006.01)
A46B 17/08 (2006.01)
F16M 13/02 (2006.01)

(52) U.S. Cl.
CPC .............. B44D 3/123 (2013.01); A46B 17/08 (2013.01); F16M 13/022 (2013.01); A46B 2200/202 (2013.01)

(58) Field of Classification Search
CPC ... B44D 3/123; A46B 17/08; A46B 2200/202; A46B 17/02; F16M 13/022; A47F 7/0035; A47F 7/0028; A47B 81/02; A47K 1/09
USPC ...................................................... 248/228.6
See application file for complete search history.

(56) References Cited

U.S. PATENT DOCUMENTS

| | | | | | |
|---|---|---|---|---|---|
| 3,104,762 | A | * | 9/1963 | Lahive | B44D 3/00 |
| | | | | | 211/74 |
| 3,286,847 | A | * | 11/1966 | Leblanc | B44D 3/123 |
| | | | | | 206/362 |
| 3,656,681 | A | * | 4/1972 | Goings | B65D 1/36 |
| | | | | | 229/407 |
| 4,003,598 | A | * | 1/1977 | Glaze | A47C 7/70 |
| | | | | | 297/161 |
| 5,887,940 | A | * | 3/1999 | Anderson | A47C 7/70 |
| | | | | | 108/157.11 |
| 6,017,085 | A | * | 1/2000 | LaCroix | A47C 7/70 |
| | | | | | 297/173 |
| 6,439,522 | B1 | * | 8/2002 | Yeh | A47G 7/044 |
| | | | | | 248/231.71 |
| 8,820,548 | B2 | * | 9/2014 | Wilson | A47B 13/14 |
| | | | | | 248/229.15 |
| 9,113,709 | B2 | * | 8/2015 | Jewett | A47B 97/04 |
| 11,701,916 | B2 | * | 7/2023 | Zambrotta | B44D 3/123 |
| | | | | | 220/697 |

* cited by examiner

*Primary Examiner* — Ko H Chan

(74) *Attorney, Agent, or Firm* — Diana Mederos

(57) ABSTRACT

A paintbrush and tool holder having a clamp feature with an adjustable screw clamp assembly and a receptacle for holding brushes and tools when used in various artistry and tooling applications. The holder is positioned either parallel or perpendicular to a platform and is configured to hold a plurality of tools or brushes in an organized and substantially level position.

12 Claims, 12 Drawing Sheets

64

64

64

64

64

42

6

PAINTBRUSH AND TOOL HOLDER WITH CLAMP

FIELD OF THE DISCLOSURE

The present disclosure relates to the structures and usage of a paintbrush and tool holder with a clamp feature. The exemplary clamps are especially for use in connection with various artistry and tooling applications such as painting, weaving, embellishing, illustrating, stitching, knitting, leatherworking, and woodworking.

BACKGROUND OF THE DISCLOSURE

Artisans use many tools in their work. These tools include brushes, erasers, knives, hooks and latches, needles, scissors, pencils, pens, charcoal, oil pastels, and other tools used in professions such as painting, embellishing, weaving, illustrating, leatherworking, and woodworking. Several variations of one tool are commonly used, and the artists need to have the variations organized, easily stored, and easily accessible while working since the tool variations are switched multiple times in one work session.

For example, painter artists use paintbrushes in a variety of shapes and sizes that they need near their easel, frame, or tripod while painting on a surface or media such as a canvas or paper. Artisans know that paintbrushes are available in standardized sizing ranging from 000 to 24 and having a variety of brush shapes and handle shapes depending on the media the artists uses.

Presently, artists store brushes in general holders such as caddies or cups where multiple brushes touch, contaminating each brush head and potentially damaging delicate brushes. Other brush and tool holders are heavy and must be placed outside of the artist's immediate reach or lack repositioning and modularity.

SUMMARY OF THE DISCLOSURE

What is needed is a paintbrush and tool holder that is removably attached to a platform and capable of holding a plurality of brushes or tools while maintaining a substantially level position parallel or perpendicular to the platform. The paintbrush and tool holder contains a receptacle having a through-hole matrix. The through-hole matrix has a series of through-holes arranged in a plurality of regions. Each region has a through-hole inner surface of a designated circumference. A brush or a tool is threaded through the through-hole, against the through-hole inner surface for a frictional fit to hold the tool or brush while also allowing for organized and uninhibited access to the tool or brush during an artistic or tooling activity. The paintbrush and tool holder is modular, having an interchangeable clamp bracket, screw clamp assembly, receptacle, and at least one fastener.

BRIEF DESCRIPTION OF THE DRAWINGS

The accompanying drawings that are incorporated in and constitute a part of this specification illustrate several embodiments of the disclosure. Together with the description, they serve to explain the principles of the disclosure.

Figure 1:
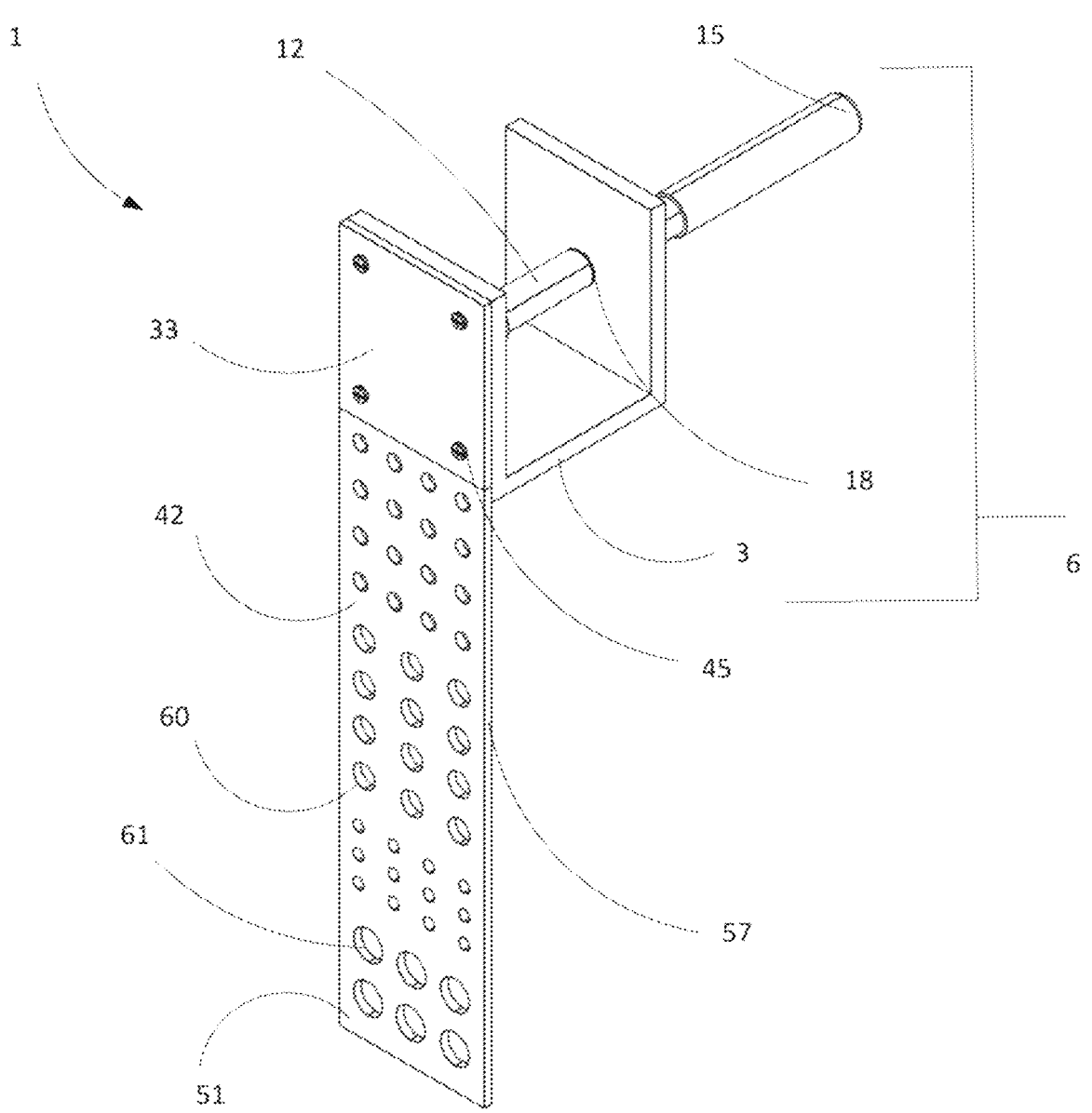
FIG. 1 illustrates a perspective front view of an exemplary paintbrush and tool holder with clamp.

NUMERALS OF THE FIGS 1. paintbrush and tool holder
3. clamp bracket
6. adjustable screw clamp assembly
9. screw bumper cap
12. threaded screw
13. threaded screw proximal end
14. threaded screw distal end
15. turning knob
18. through-hole
21. clamp inner back surface
24. clamp inner top surface
27. clamp inner bottom surface
30. clamp outer edge
33. clamp top portion
36. clamp bottom portion
39. fastener
42. receptacle body
45. fastener through-hole
48. receptacle fastener portion
51. receptacle top surface
54. receptacle bottom surface
57. receptacle outer edge
60. receptacle through-hole
61. receptacle through-hole inner surface
63. receptacle through-hole matrix
64. matrix region
66. attachment platform
67. attachment platform edge
68. attachment platform surface
69. paintbrush
70. brush head
71. brush handle
72. tool
73. tool head
74. tool handle
77. mount body

DETAILED DESCRIPTION

The present disclosure provides generally for a paintbrush and tool holder having a clamp feature with an adjustable screw clamp assembly and a receptacle for holding brushes and tools when used in various artistry and tooling applications. The holder is positioned either parallel or perpendicular to a platform and is configured to hold a plurality of tools or brushes in an organized and substantially level position without regard for even placement and weight of the tools or brushes into receptacle through-holes. Exemplary paintbrush and tool holders may also have a surface-mount configuration without a clamp.

An appreciated benefit of the paintbrush and tool holders of the disclosure is the holder maintaining either a parallel or perpendicular alignment of a receptacle body substantially 180 degrees relative to the surface to which it is mounted, whether it be a table, easel, framed canvas, wall, or other structure. The paintbrush and tool holder will remain substantially level at either 178, 179, 180, 181, or 182 degrees, even when the weight is not equally balanced throughout the receptacle body when paintbrushes and tools are disposed of therein. For example, a tool weighing 10 ounces may be positioned in a receptacle through hole on one side of the receptacle body, and a paintbrush weighing 1 ounce may be positioned in a receptacle through hole on the opposite side of the receptacle body, creating a weight differential. Despite uneven weight distribution, the paintbrush and tool holder, specifically the receptacle body remains substantially level. In addition, the tool and the paintbrush remain substantially upright at either 88, 89, 90, 91, or 92 degrees perpendicular to the receptacle body. This is important for maintaining an artist's tools, improving organization, improving visibility of a variety of brushes and tools, and preventing cross-contamination or destruction of brushes and tools.

Exemplary paintbrush and tool holders may be composed of a metal, a wood, a plastic, a natural polymer, a synthetic polymer, or combinations thereof. Furthermore, the screw cap and screw bumper cap may be constructed out of a polymer, wood, or rubber, or combinations thereof.

In the following sections, detailed descriptions of examples and methods of the disclosure will be given. The description of both preferred and alternative examples that are exemplary only, and it is understood that to those skilled in the art that variations, modifications, and alterations may be apparent. It is therefore to be understood that the examples do not limit the broadness of the aspects of the underlying disclosure as defined by the claims.

DETAILED DESCRIPTIONS OF THE DRAWINGS

Figure 2:
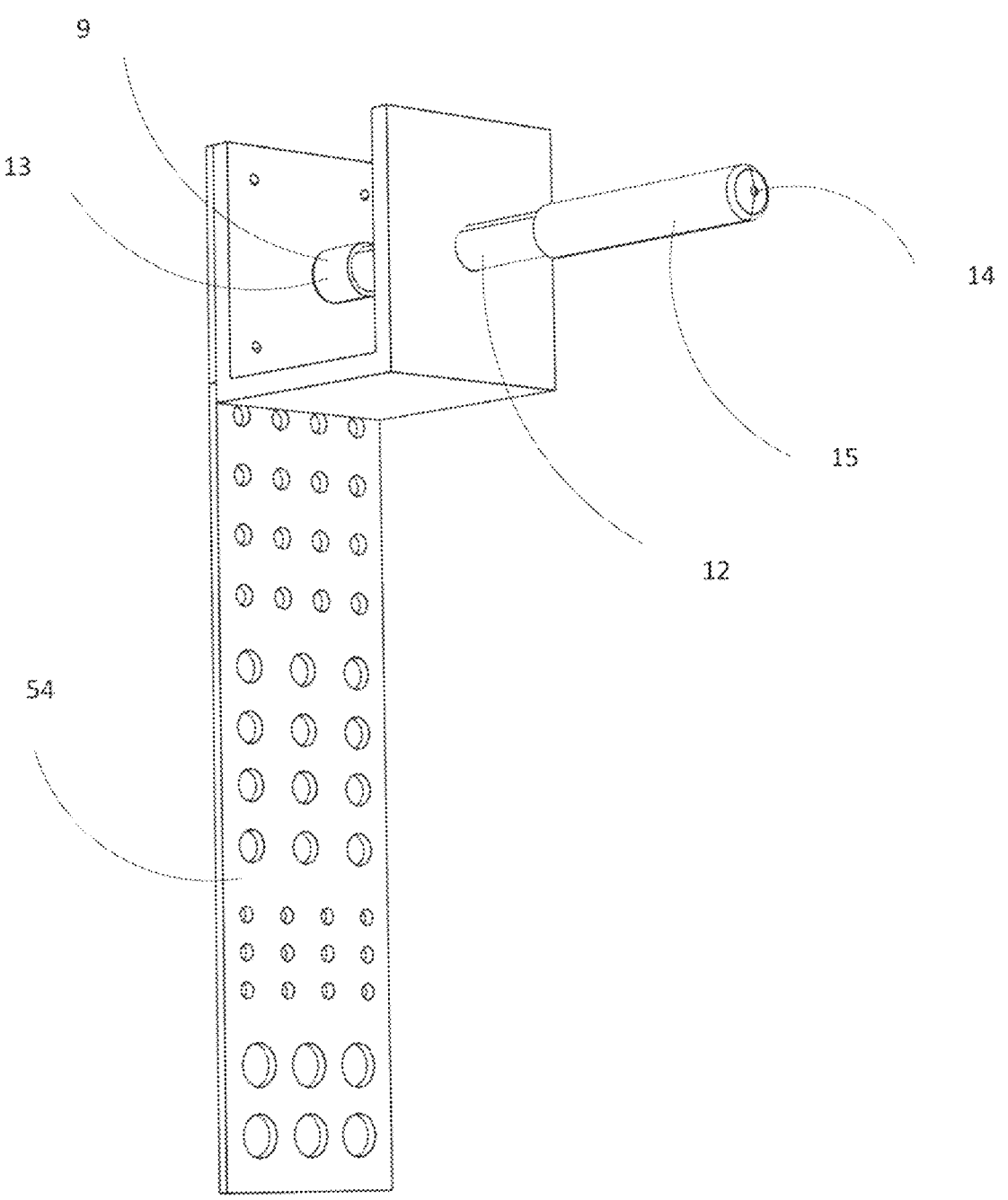
FIG. 2 illustrates a perspective bottom view of the exemplary paintbrush and tool holder with clamp of FIG. 1.
Figure 3:
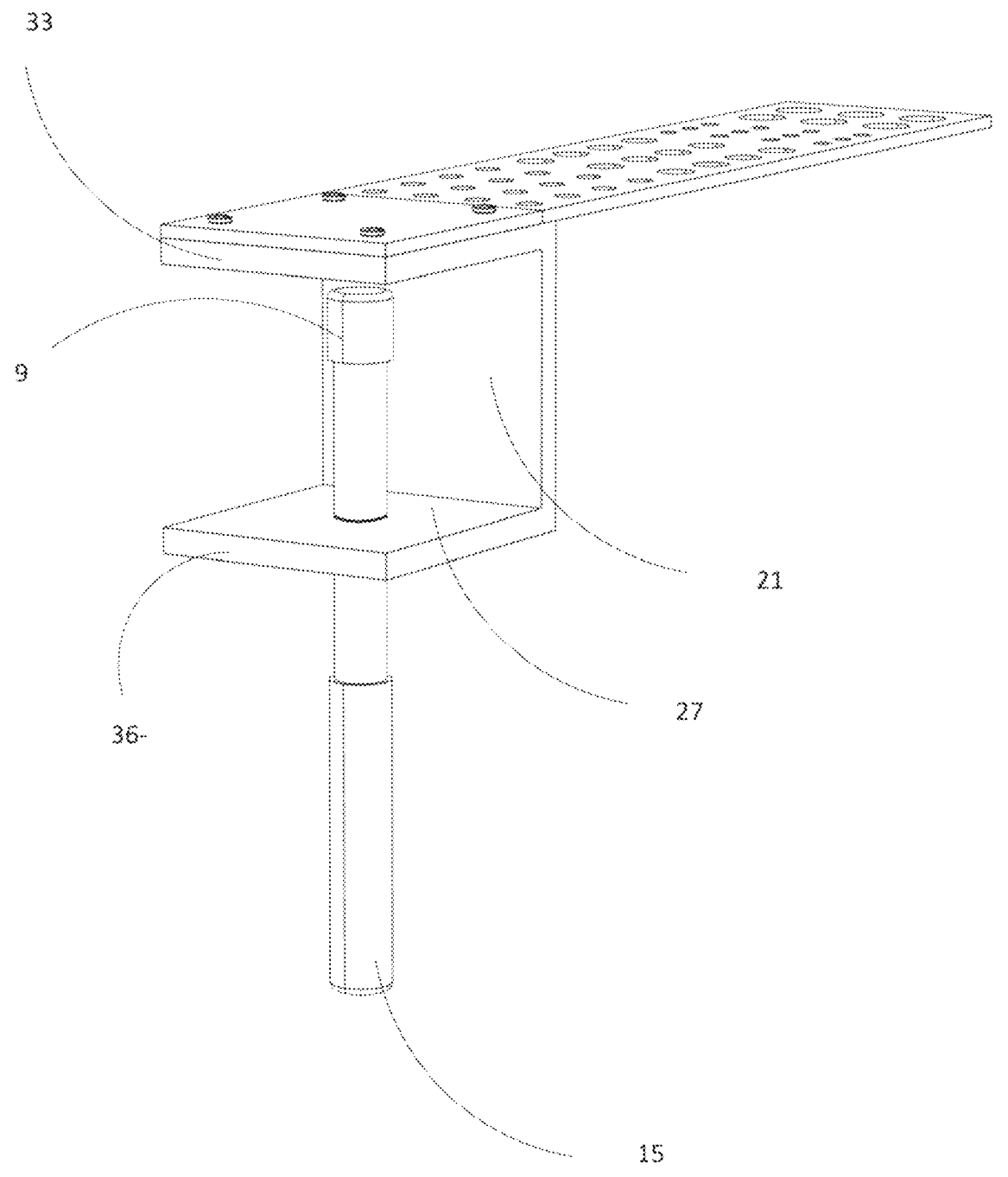
FIG. 3 illustrates a perspective rear view of the exemplary paintbrush and tool holder with clamp of FIGS. 1 and 2.

Referring now to FIGS. 1, 2, and 3, various perspective views of an exemplary paintbrush and tool holder with clamp ("holder") are shown. In preferred embodiments, the holder may have a clamp bracket in a C configuration. The clamp has a clamp inner back surface, a clamp inner top surface, a clamp inner bottom surface, a clamp outer edge, a clamp top portion, and a clamp bottom portion. The clamp bracket may be fastened to an attachment platform having an attachment platform surface and an attachment platform edge. The attachment platform may have at least one fastener. Exemplary embodiments herein show the attachment platform having either two or four fasteners. In this particular example, the attachment platform is at an end of the receptacle body rather than in the center of the receptacle body. In this configuration, the receptacle body extends perpendicularly from a surface to which the clamp is mounted.

The clamp also has an adjustable screw clamp assembly. The adjustable screw clamp assembly is a threaded screw with a screw bumper cap at a threaded screw proximal end and a turning knob at a threaded screw distal end. The threaded screw passes from the clamp bottom portion and through a through-hole at the clamp inner bottom surface and toward the clamp inner top surface.

The holder has a receptacle body in a polygonal shape such as a rectangle, square, hexagon, triangle, semi-circle, trapezoid, pentagon, or octagon. The receptacle body has a fastener portion. The fastener portion connects to the clamp. The receptacle body has a top surface, a bottom surface, an outer edge, and a through-hole matrix comprising a plurality of receptacle through-holes. Some through-hole matrices may have a plurality of regions. Each region may contain a plurality of receptacle through-holes having the same circumference with each region. Additional regions may have a through-hole circumference that is not equal to the through-hole circumference of another region. In this exemplary embodiment, the receptacle body contains four regions, defined by the circumference of the receptacle through holes in each region. For example, a first region may have through holes with a circumference of 2 mm and a matrix in a 4×4 configuration, a second region with 4 mm and a matrix in a 3×4 configuration, a third region with 1 mm and a 4×3 configuration, and a fourth region with 8 mm and a 3×2 configuration.

When in use, the receptacle body is substantially level relative to the attachment platform surface regardless of the receptacle through-holes holding a brush having a brush head and a brush handle or a tool having a tool head and a tool handle. In addition, when in use, the head of a brush held in a first receptacle through-hole does not contact a brush head of a brush held in a second receptacle through-hole beside the first receptacle through-hole, and the brush is substantially upright, perpendicular to the receptacle body.

Figure 4:
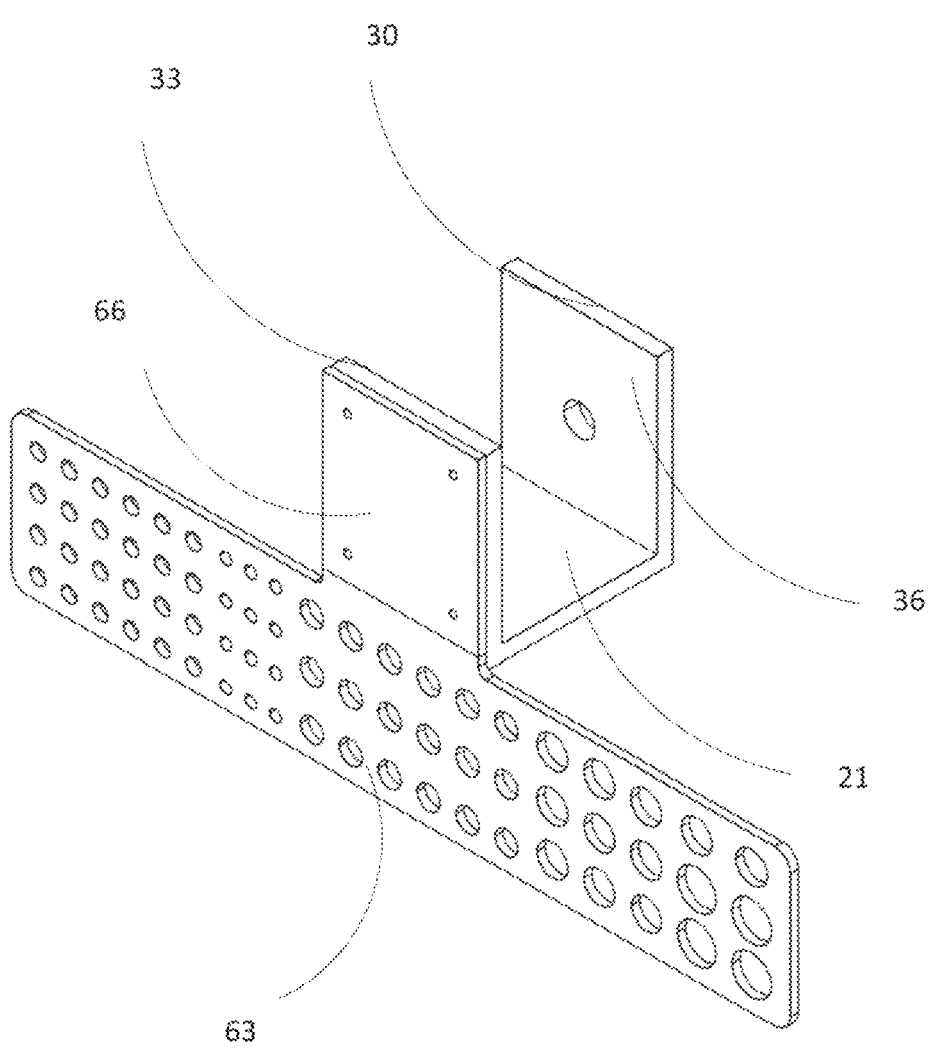
FIG. 4 illustrates a perspective front view of an alternative exemplary paintbrush and tool holder without clamp.
Figure 5:
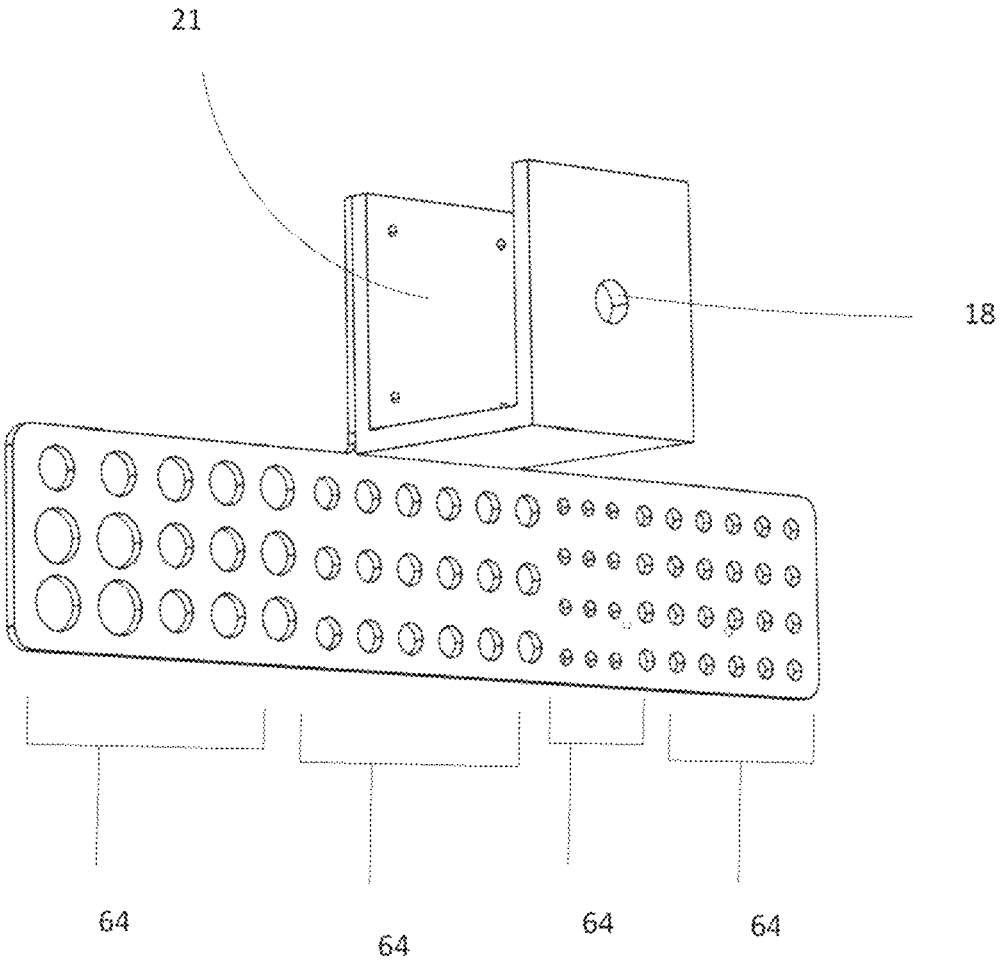
FIG. 5 illustrates a perspective bottom view of the alternative exemplary paintbrush and tool holder without clamp of FIG. 4.
Figure 6:
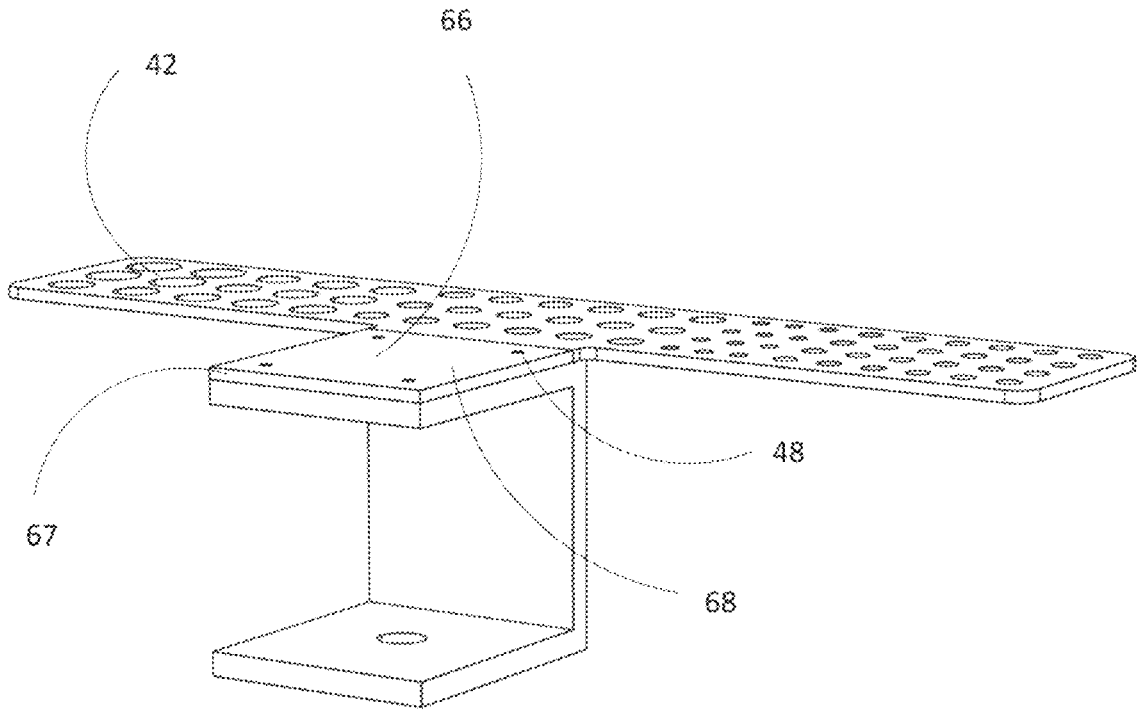
FIG. 6 illustrates a perspective rear view of the alternative exemplary paintbrush and tool holder without clamp of FIGS. 4 and 5.

Referring now to FIGS. 4, 5, and 6, various perspective views of an alternative exemplary paintbrush and tool holder without clamp are shown. In this example the attachment surface is in the center of the receptacle body rather than at an end of the receptacle body. In this configuration, the receptacle body extends parallel to a surface to which the clamp is mounted. The fastener through hole is more apparent in these figures.

Figure 7:
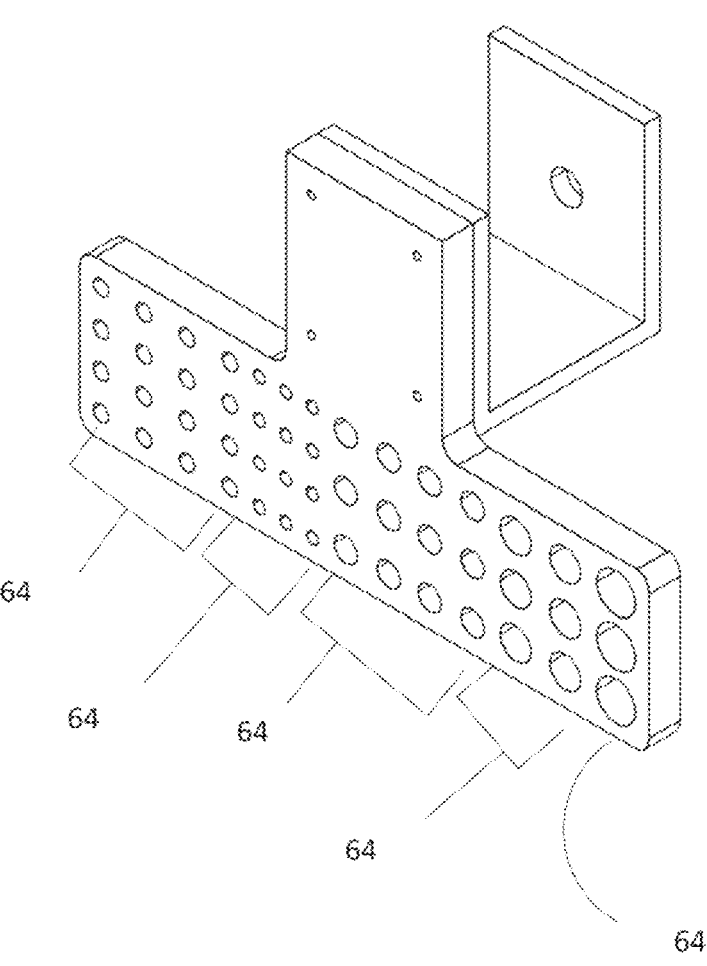
FIG. 7 illustrates a front perspective view an alternative exemplary paintbrush and holder tool with an alternative matrix configuration.
Figure 8:
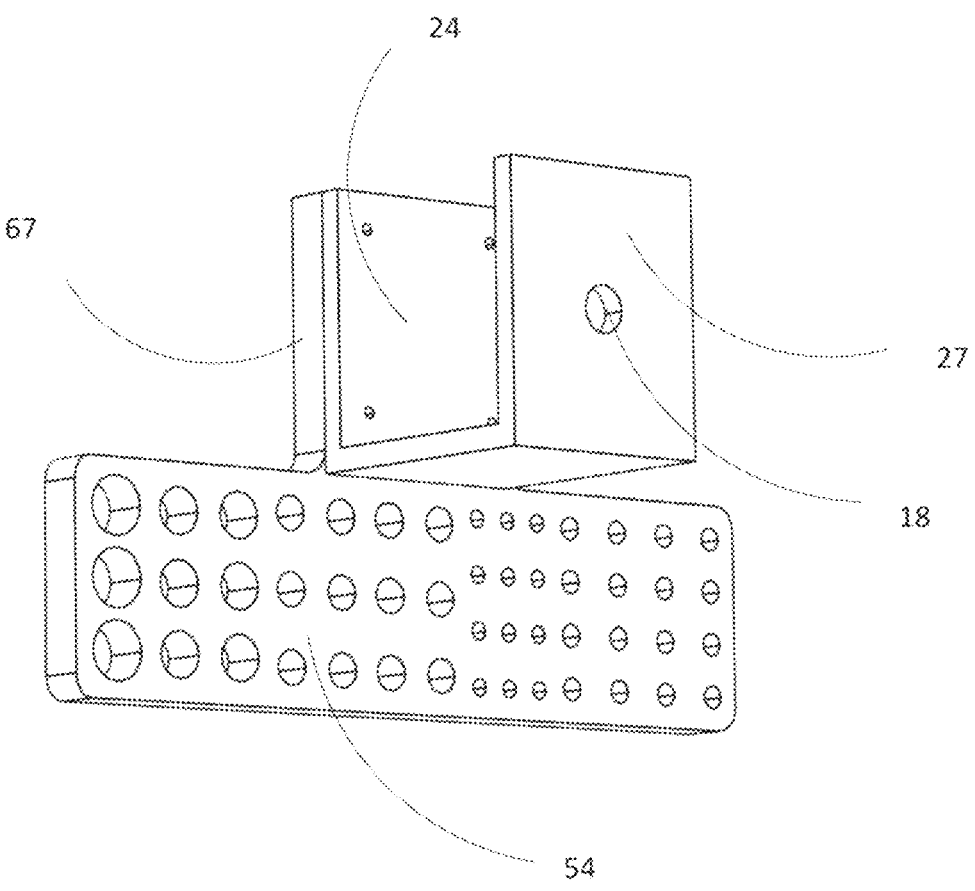
FIG. 8 illustrates a bottom perspective view of the alternative exemplary paintbrush and holder tool with alternative matrix of FIG. 7.
Figure 9:
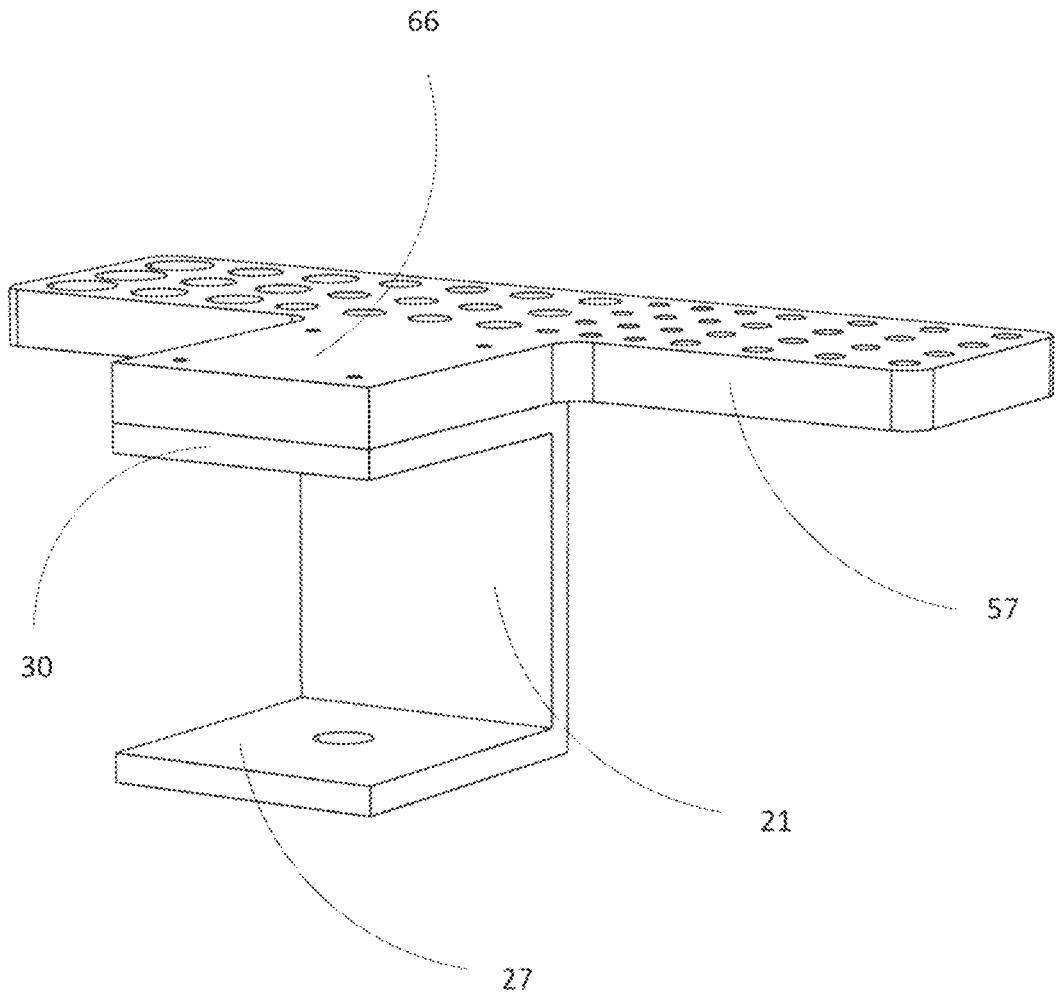
FIG. 9 illustrates a rear perspective view of the alternative exemplary paintbrush and holder tool with alternative matrix of FIGS. 7 and 8.

Referring now to FIGS. 7, 8, and 9, various perspective views of an alternative exemplary paintbrush and holder tool with an alternative matrix configuration are shown. This exemplary embodiment demonstrates a receptacle head with an alternative configuration. In this example, the receptacle head has five regions. A first region has a 4×4 configuration, a second region has a 44×3 configuration, a third region has a 3×4 configuration, a fourth region has a 3×2 configuration, and a fifth region has a 3×1 configuration.

Figure 10:
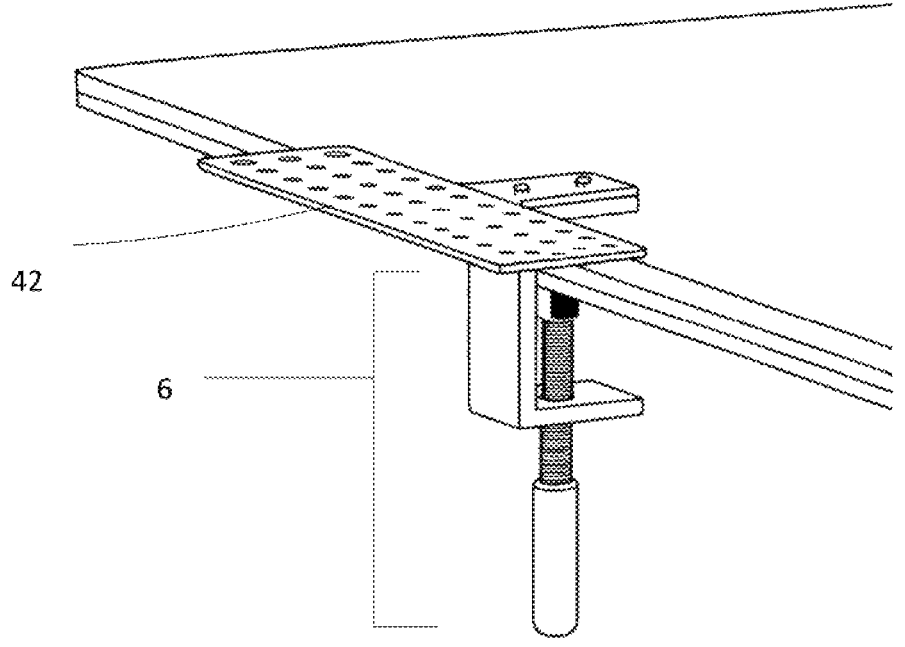
FIG. 10 illustrates a perspective view of an exemplary paintbrush and tool holder clamped to a table.

Referring now to FIG. 10, a perspective view of an exemplary paintbrush and tool holder clamped to a table is shown. This exemplary embodiment shows the holder as shown in FIGS. 4, 5, and 6 clamped to a table. The receptacle body is aligned parallel to the surface to which the clamp is mounted, a table in this case.

Figure 11:
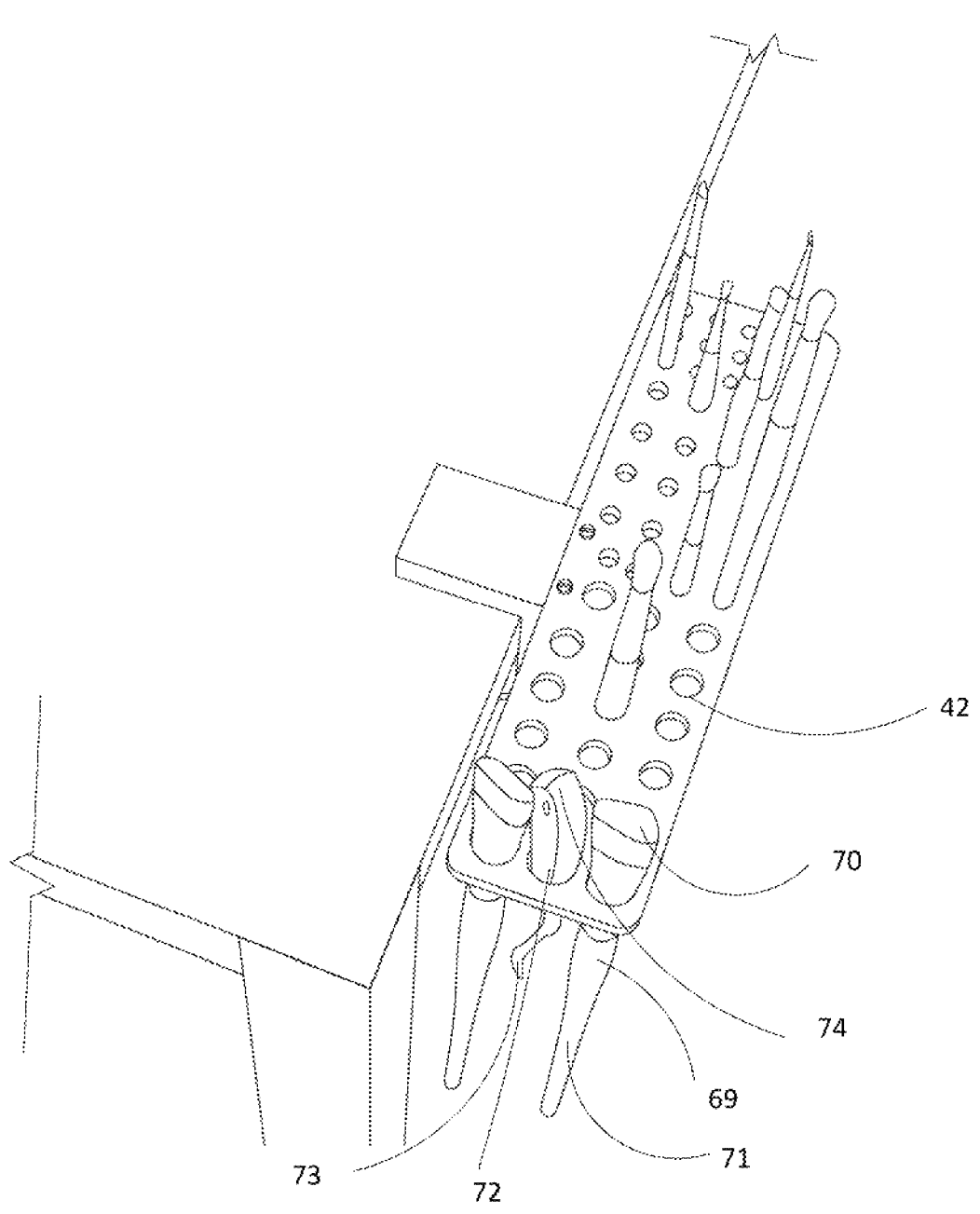
FIG. 11 illustrates a top view of an exemplary paintbrush and tool holder clamped to a table and holding paintbrushes and tools.

Referring now to FIG. 11, a top view of an exemplary paintbrush and tool holder clamped to a table and holding paintbrushes and tools is shown. This example shows how various paint brushes and tools of different weights are frictionally held in the receptacle through holes at the through hole interior surface. The brushes and tools are held substantially upright, and the receptacle body is substantially level despite uneven weight distribution.

Figure 12:
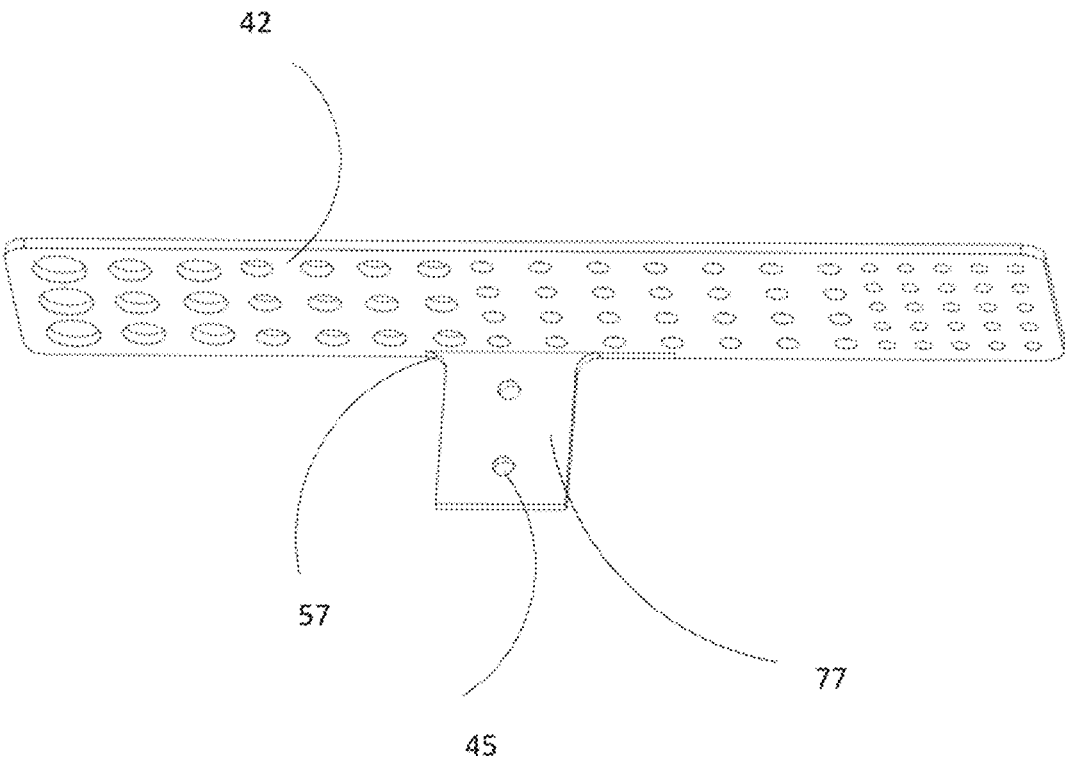
FIG. 12 illustrates a front perspective view of an exemplary paintbrush and tool holder in a surface-mount configuration.

Referring now to FIG. 12, a front perspective view of an exemplary paintbrush and tool holder in a surface-mount configuration is shown. In this exemplary embodiment, the receptacle body lacks an attachment surface. Instead, an edge of the receptacle body is formed into a mount body. The mount body may contain fastener through holes to mount the holder to a surface such as a wall.

CONCLUSION

A number of embodiments of the present disclosure have been described. While this specification contains many specific implementation details, these details should not be construed as limitations on the scope of any disclosures or of what may be claimed.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. Nevertheless, it will be understood that various modifications may be made without departing from the spirit and scope of the claimed disclosure.

What is claimed is:

1. A paintbrush and tool holder, comprising:

a clamp bracket in a C configuration having a clamp inner back surface, a clamp inner top surface, a clamp inner bottom surface, a clamp outer edge, a clamp top portion, and a clamp bottom portion;

an adjustable screw clamp assembly comprising a threaded screw with a screw bumper cap at a threaded screw proximal end and a turning knob at a threaded screw distal end, wherein the threaded screw passes from the clamp bottom portion and through a through-hole at the clamp inner bottom surface and toward the clamp inner top surface;

a receptacle body in a polygonal shape and comprising a fastener portion, a top surface, a bottom surface, an outer edge, and a through-hole matrix comprising a plurality of receptacle through-holes, wherein the through-hole matrix comprises a plurality of regions, wherein each region contains a plurality of receptacle through-holes having the same circumference, wherein each region of the plurality of regions has a through-hole circumference that is not equal to the through-hole circumference of another region;

wherein the clamp bracket is fastened to an attachment platform having an attachment platform surface and an attachment platform edge;

wherein the attachment platform and the receptacle body are a single piece fixed to the clamp top portion;

wherein the receptacle body and the attachment platform are level at 180 degrees regardless of unequal weight distribution of tools or paintbrushes placed upright and frictionally held in the receptacle through-holes; and wherein the brush head of a brush held in a first receptacle through-hole does not contact a brush head of a brush held in a second receptacle through-hole beside the first receptacle through-hole.

2. The paintbrush and tool holder of claim 1, wherein the polygonal shape of the receptacle body is rectangular.

3. The paintbrush and tool holder of claim 1, wherein the receptacle matrix comprises a first region of through-holes having a circumference of 1-2 mm and a second region of through-boles having a circumference of 10-12 mm.

4. The paintbrush and tool holder of claim 3, wherein the first region has a matrix of through-holes arranged 4 by 4 for a total of 16 through holes.

5. The paintbrush and tool holder of claim 3, wherein the second region has a matrix of through-holes arranged 2 by 3 for a total of 6 through holes.

6. The paintbrush and tool holder of claim 1, wherein the receptacle body comprises 4 regions.

7. The paintbrush and tool holder of claim 1, wherein the adjustable screw cap assembly is made of a metal.

8. The paintbrush and tool holder of claim 1, wherein the adjustable screw cap assembly is made of a wood.

9. The paintbrush and tool holder of claim 1, wherein the adjustable screw cap assembly is made of a polymer.

10. The paintbrush and tool holder of claim 1, wherein the receptacle body is made of a metal.

11. The paintbrush and tool holder of claim 1, wherein the receptacle body is made of a wood.

12. The paintbrush and tool holder of claim 1, wherein the receptacle body is made of a polymer.

* * * * *